United States Patent
Li et al.

(10) Patent No.: US 12,253,858 B2
(45) Date of Patent: Mar. 18, 2025

(54) METHOD OF TRAVEL CONTROL, DEVICE AND STORAGE MEDIUM

(71) Applicant: ECOVACS ROBOTICS CO., LTD., Suzhou (CN)

(72) Inventors: Yilan Li, Suzhou (CN); Kaixuan Xie, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 372 days.

(21) Appl. No.: 17/950,060

(22) Filed: Sep. 21, 2022

(65) Prior Publication Data

US 2023/0015411 A1  Jan. 19, 2023

Related U.S. Application Data

(62) Division of application No. 16/659,399, filed on Oct. 21, 2019, now Pat. No. 11,487,297.

(30) Foreign Application Priority Data

Oct. 22, 2018 (CN) .......................... 201811232109.2

(51) Int. Cl.
 *G05D 1/00* (2024.01)
 *A47L 11/24* (2006.01)
 *A47L 11/40* (2006.01)

(52) U.S. Cl.
 CPC .............. *G05D 1/024* (2013.01); *A47L 11/24* (2013.01); *A47L 11/4011* (2013.01); *A47L 2201/04* (2013.01)

(58) Field of Classification Search
 CPC ...... G05D 1/024; G05D 1/0257; A47L 11/24; A47L 11/4011; A47L 2201/04; G01S 17/931
 See application file for complete search history.

(56) References Cited

U.S. PATENT DOCUMENTS

| 7,218,994 B2 | 5/2007 | Kanda |
| 7,581,282 B2 | 9/2009 | Woo |

(Continued)

FOREIGN PATENT DOCUMENTS

| CN | 1748626 A | 3/2006 |
| CN | 102314176 A | 1/2012 |

(Continued)

OTHER PUBLICATIONS

European Search Report dated Nov. 26, 2021 as received in application No. 19876513.3.

(Continued)

*Primary Examiner* — Bhavesh V Amin
(74) *Attorney, Agent, or Firm* — Maschoff Brennan

(57) ABSTRACT

The embodiments of the present disclosure provide a method of travel control, a device and a storage medium. In some exemplary embodiments of the present disclosure, a self-mobile device collects three-dimensional environment information on a travel path of itself in the travel process, identifies an obstacle area and a type thereof existing on the travel path of the self-mobile device based on the three-dimensional environment information, and the self-mobile device adopts different travel controls in a targeted manner for different types of the area, such that the obstacle avoidance performance of the self-mobile device is improved by adopting the method of the travel control in the present disclosure.

11 Claims, 4 Drawing Sheets

(56) References Cited

U.S. PATENT DOCUMENTS

| | | |
|---|---|---|
| 8,139,109 B2 | 3/2012 | Schmiedel |
| 8,949,016 B1 | 2/2015 | Ferguson |
| 9,103,671 B1 | 8/2015 | Breed |
| 9,285,805 B1 | 3/2016 | Pollock |
| 9,411,338 B2 | 8/2016 | Hanaoka |
| 9,474,427 B2 | 10/2016 | Lee et al. |
| 9,636,265 B2 | 5/2017 | Furuta et al. |
| 9,840,256 B1 | 12/2017 | Valois |
| 9,841,763 B1 | 12/2017 | Valois |
| 9,915,733 B2 | 3/2018 | Fried |
| 10,029,368 B2 | 7/2018 | Wolowelsky |
| 10,442,083 B2 | 10/2019 | Wolowelsky |
| 11,009,606 B2 | 5/2021 | Kawazoe |
| 2005/0010331 A1 | 1/2005 | Taylor et al. |
| 2005/0134440 A1 | 6/2005 | Breed |
| 2005/0165508 A1 | 7/2005 | Kanda |
| 2013/0054022 A1 | 2/2013 | Jang et al. |
| 2014/0088761 A1 | 3/2014 | Shamlian et al. |
| 2014/0222246 A1 | 8/2014 | Mohamadi |
| 2014/0257563 A1 | 9/2014 | Park et al. |
| 2015/0012164 A1 | 1/2015 | Yu |
| 2015/0202770 A1 | 7/2015 | Patron |
| 2015/0362921 A1 | 12/2015 | Hanaoka |
| 2016/0129593 A1 | 5/2016 | Wolowelsky |
| 2016/0271795 A1 | 9/2016 | Vicenti |
| 2017/0023943 A1 | 1/2017 | Taira |
| 2017/0336800 A1 | 11/2017 | Chou et al. |
| 2018/0020893 A1 | 1/2018 | Lee et al. |
| 2018/0032075 A1 | 2/2018 | Valois |
| 2018/0038958 A1 | 2/2018 | Kawazoe |
| 2018/0107215 A1 | 4/2018 | Djuric |
| 2018/0164429 A1 | 6/2018 | Brankovic et al. |
| 2018/0304463 A1 | 10/2018 | Wolowelsky |
| 2019/0018416 A1 | 1/2019 | Gassend |
| 2019/0171210 A1 | 6/2019 | Passot et al. |
| 2020/0016752 A1 | 1/2020 | Wolowelsky |
| 2020/0125103 A1 | 4/2020 | Li |

FOREIGN PATENT DOCUMENTS

| | | |
|---|---|---|
| CN | 102949144 A | 3/2013 |
| CN | 104027040 A | 9/2014 |
| CN | 104245244 A | 12/2014 |
| CN | 105824313 A | 8/2016 |
| CN | 105866790 A | 8/2016 |
| CN | 106200645 A | 12/2016 |
| CN | 106249239 A | 12/2016 |
| CN | 106772435 A | 5/2017 |
| CN | 107427177 A | 12/2017 |
| CN | 108000561 A | 5/2018 |
| CN | 108562913 A | 9/2018 |
| CN | 108568868 A | 9/2018 |
| CN | 110632931 A | 12/2019 |
| KR | 10-0865110 B1 | 10/2008 |
| KR | 10-2018-0061949 A | 6/2018 |
| WO | 2016204641 A1 | 12/2016 |
| WO | 2017197197 A1 | 11/2017 |

OTHER PUBLICATIONS

CN Office Action dated May 7, 2021 as received in application No. 201811232109.2.
CN Office Action in Application No. 201811232109.2 dated Nov. 26, 2020.
CN Office Action dated May 6, 2024 as received in Application No. 202111175760.2.
CN Notice of Rejection dated Jul. 15, 2024 as received in Application No. 202111175760.2.
Chinese Office Action issued in corresponding application No. 202111175760.2, dated Dec. 7, 2023.

METHOD OF TRAVEL CONTROL, DEVICE AND STORAGE MEDIUM

CROSS-REFERENCE TO RELATED APPLICATION

The present disclosure claims priority to Chinese Patent Application No. 201811232109.2, entitled "Method of Travel Control, Device and Storage Medium", filed on Oct. 22, 2018, which is incorporated herein by reference in its entirety.

TECHNICAL FIELD

The present disclosure relates to the technical field of artificial intelligence, and particularly to a method of travel control, a device and a storage medium.

BACKGROUND ART

In the process of floor sweeping, a floor sweeping robot needs to avoid obstacles for better cleaning.

The obstacle avoidance function of the floor sweeping robot is generally implemented by matching a distance sensor, for example, an infrared sensor, a laser sensor, an ultrasonic sensor and the like, with a spring baffle, where when the distance sensor detects that there is an obstacle on a front or the spring baffle touches an obstacle, the machine will return or bypass according to the control instruction of obstacle avoidance.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description of Example Embodiments. This Summary is not intended to identify key features or essential characteristics of the claimed subject matter, nor is it intended to be used as an aid in determining the scope of the claimed subject matter.

Various aspects of the present disclosure provide a method of travel control of a self-mobile device, which solves the problem of inaccurate judgment of an obstacle by the self-mobile device in the prior art and improves the obstacle avoidance capability of the self-mobile device.

Embodiments of the present disclosure provide a method of travel control, which is applicable to a self-mobile device and includes:
collecting three-dimensional environment information on a travel path of the self-mobile device;
identifying an obstacle area and a type thereof existing on the travel path of the self-mobile device based on the three-dimensional environment information;
performing travel control on the self-mobile device for the obstacle area according to the type of the obstacle area.

The embodiments of the present disclosure further provide a self-mobile device, which includes: a mechanical body, where the mechanical body is provided with an area array solid-state laser radar, one or more processors and one or more memories for storing computer programs;
the area array solid-state laser radar is configured to collect three-dimensional environment information on a travel path of the self-mobile device;
the one or more processors are configured to execute the computer programs for:
identifying an obstacle area and a type thereof existing on the travel path of the self-mobile device based on the three-dimensional environment information; and
performing travel control on the self-mobile device for the obstacle area according to the type of the obstacle area.

The embodiments of the present disclosure further provide a computer-readable storage medium having stored thereon computer programs that, when executed by one or more processors, cause the one or more processors to perform actions including:
collecting three-dimensional environment information on a travel path of a self-mobile device;
identifying an obstacle area and a type thereof existing on the travel path of the self-mobile device based on the three-dimensional environment information; and
performing travel control on the self-mobile device for the obstacle area according to the type of the obstacle area.

In some exemplary embodiments of the present disclosure, the self-mobile device collects three-dimensional environment information on a travel path of itself in the travel process, identifies an obstacle area and a type thereof existing on the travel path of the self-mobile device based on the three-dimensional environment information, and the self-mobile device adopts different travel controls in a targeted manner for different types of the area, such that the obstacle avoidance performance of the self-mobile device is improved by adopting the method of the travel control in the present disclosure.

BRIEF DESCRIPTION OF THE DRAWINGS

The accompanying drawings are included to provide a further understanding of the present disclosure and are incorporated in and constitute a part of the present disclosure, and the exemplary embodiments of the present disclosure together with the description serve to explain the present disclosure and are not to be construed as unduly limiting the present disclosure. In the accompanying drawings.

DETAILED DESCRIPTION OF EXAMPLE EMBODIMENTS

The objectives, technical solution and advantages of the present disclosure will be more apparent from the following detailed description of the technical solution of the present disclosure taken in conjunction with the specific embodiments and the accompanying drawings of the present disclosure. It is apparent that the embodiments described herein are merely a part of embodiments of the present disclosure and not all of the embodiments. Based on the embodiments in the present disclosure, all other embodiments obtained by a person of ordinary skill in the art without involving any inventive effort are within the scope of protection of the present disclosure.

In the practical application of a household robot, it is necessary to measure and map obstacle information in the scene so as to effectively avoid obstacles and plan paths. Based on different sensors, there are two main obstacle avoidance methods for the existing robots: laser direct structuring (LDS) technology and visual simultaneous localization and mapping (Vslam) technology. Under the condition of incomplete mapping, when an unknown obstacle is encountered, the robot needs to carry out dynamic obstacle avoidance. In this situation, LDS can only detect the information of obstacles in one plane but cannot measure a vertical direction, such that the machine body may easily drill into and jam in areas with narrow gaps, such as areas under a cabinet and a bed, causing unnecessary actions. Similarly, in this situation, the data acquired by Vslam lack landmark information, thereby resulting in the robot's inaccurate judgment of obstacles.

To address some of the problems of existing floor sweeping robots in cleaning floors, in some exemplary embodiments of described in the present disclosure, a self-mobile device may collect three-dimensional environment information on a travel path of itself during the travel process, may identify an obstacle area and a type thereof existing on the travel path of the self-mobile device based on the three-dimensional environment information, and the self-mobile device may adopt different travel control in a targeted manner for different types of the area, such that the obstacle avoidance performance of the self-mobile device is improved by adopting the method of the travel control described in the present disclosure.

The technical scheme provided by the embodiments of the present disclosure is described in detail below with reference to the accompanying drawings.

Figure 1:
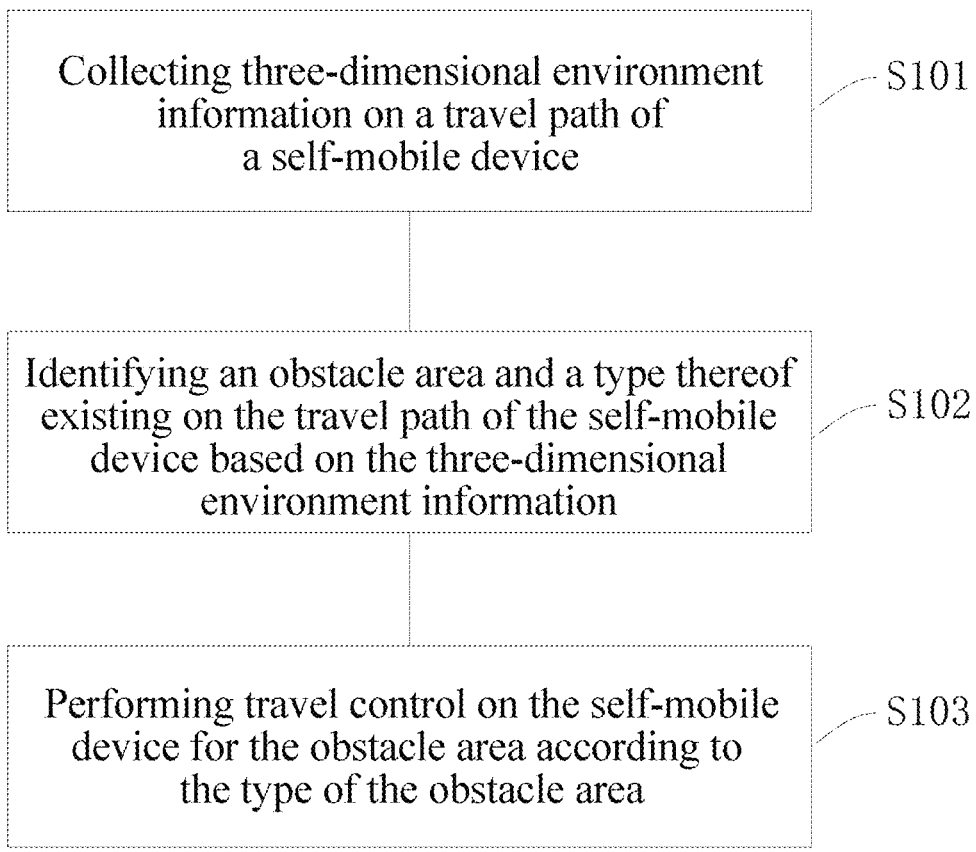
FIG. 1 is a flow diagram of a method of travel control according to an exemplary embodiment of the present disclosure.

FIG. 1 is a flow diagram of a method of travel control according to an exemplary embodiment of the present disclosure, and as shown in FIG. 1, the method includes:

S101: collecting three-dimensional environment information on a travel path of the self-mobile device;

S102: identifying an obstacle area and a type thereof existing on the travel path of the self-mobile device based on the three-dimensional environment information;

S103: performing travel control on the self-mobile device for the obstacle area according to the type of the obstacle area.

The execution main body of the method in the embodiment of the present disclosure can be a self-mobile device such as an unmanned vehicle, a robot and the like, the types of the robot and the unmanned vehicle are not limited, and the robot can be a floor sweeping robot, a following robot, a greeting robot and the like. Different devices acquire three-dimensional environment information in corresponding working environments aiming at different working environments, for example, a floor sweeping robot can acquire a three-dimensional environment image of an area such as a living room, a kitchen, a toilet, a bedroom and the like in the travel process during the sweeping process of a household; during the shopping guide process of a shopping guide robot in a shopping mall, the three-dimensional environment image of various areas such as a pedestrian passageway, a shop and the like can be obtained in the travel process; during the target following process of a following robot, three-dimensional environment information of the following target and the surrounding environment in the advancing process can be obtained in the travel process.

In some embodiments, three-dimensional environment information on a travel path of the self-mobile device may be collected in real time by installing an area array solid-state laser radar on the self-mobile device. The area array solid-state laser radar is a novel sensor that is low cost, is solidly constructed, and has a small form-factor. The area array solid-state laser radar may quickly and accurately obtain a large amount of three-dimensional information, may well meet the requirement on information quantity in the positioning and mapping process, may detect whether a constraint space formed by an obstacle on a front can be passed or not when the area array solid-state laser radar is at a certain distance from the obstacle, and may avoid unnecessary exploration and collision. The area array solid-state laser radar uses a diffraction beam splitting element to perform n*n beam splitting on an emitted laser beam, and a single beam splitting uses a triangular ranging principle, namely: the emitted laser is collimated by a beam expander and then irradiated to a target surface; a target echo signal received by a system is received; the central position of a scattered light spot is measured through a position sensing element; and multi-beam splitting information is fused to obtain three-dimensional data information.

In the above-described embodiment, the obstacle area and the type thereof existing on the travel path of the self-mobile device are identified based on the three-dimensional environment information collected by the area array laser radar from the travel path of the self-mobile device. Alternatively, based on the three-dimensional environment information collected on the travel path of the self-mobile device, an abnormal area on the travel path of the self-mobile device is identified as an obstacle area; and a type of the obstacle area is determined according to the abnormal state of the obstacle area relative to a working plane. In the embodiment, when there is a certain distance from the obstacle, the obstacle area and the type of the obstacle area are determined, and different travel controls are performed on the self-mobile device for different types of obstacle areas.

In the above and the following embodiments, the types of the obstacle areas may include at least the following three types: an area to be climbed over, an area to be stepped down and an area to be traversed. The manner in which the type of each obstacle area is determined based on the abnormal state of the obstacle area relative to the working plane is described below.

Figure 2:
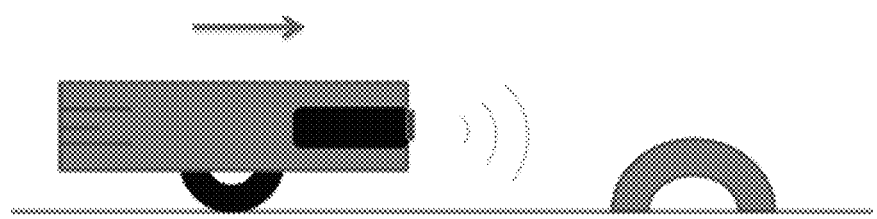
FIG. 2 is a schematic illustration of a doorsill on a front of a floor sweeping robot according to an exemplary embodiment of the present disclosure.
Figure 3:
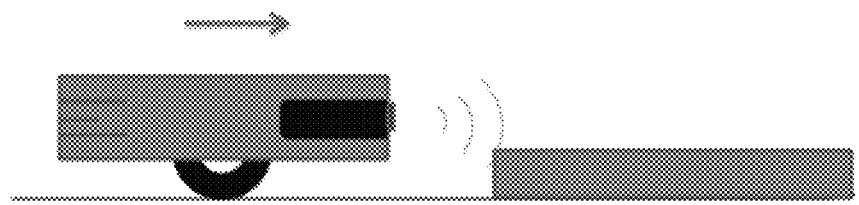
FIG. 3 is a schematic illustration of an upper step on a front of a floor sweeping robot according to an exemplary embodiment of the present disclosure.
Figure 4:
FIG. 4 is a schematic illustration of an upward slope on a front of a floor sweeping robot according to an exemplary embodiment of the present disclosure.

The method for determining the area to be climbed over: if there is an obstacle protruding out of the working plane in the obstacle area and no gap on the obstacle, the obstacle area may be determined to be an area to be climbed over. That is, there is an obstacle in the obstacle area that may require the self-mobile device to climb over, for example: a doorsill (FIG. 2 is a schematic illustration of a doorsill on a front of a floor sweeping robot in an exemplary embodiment of the present disclosure, and the direction indicated by an arrow is the travel direction of the floor sweeping robot), and an upper step (FIG. 3 is a schematic illustration of an upper step on a front of a floor sweeping robot in an exemplary embodiment of the present disclosure and the direction indicated by an arrow is the travel direction of the floor sweeping robot), an upward slope (FIG. 4 is a schematic illustration of an upward slope on a front of a floor sweeping robot in an exemplary embodiment of the present disclosure, and the direction indicated by an arrow is the travel direction of the floor sweeping robot) and the like.

Figure 7:
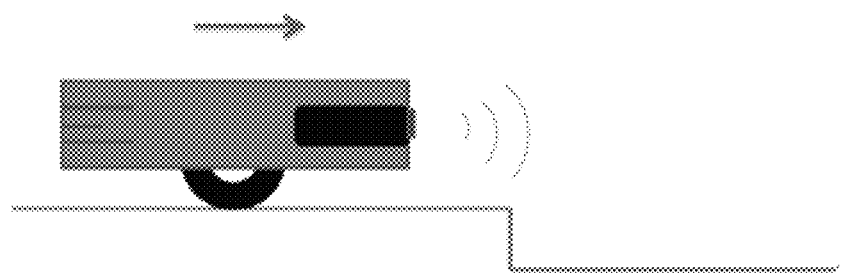
FIG. 7 is a schematic illustration of a lower step on a front of a floor sweeping robot according to an exemplary embodiment of the present disclosure.
Figure 8:
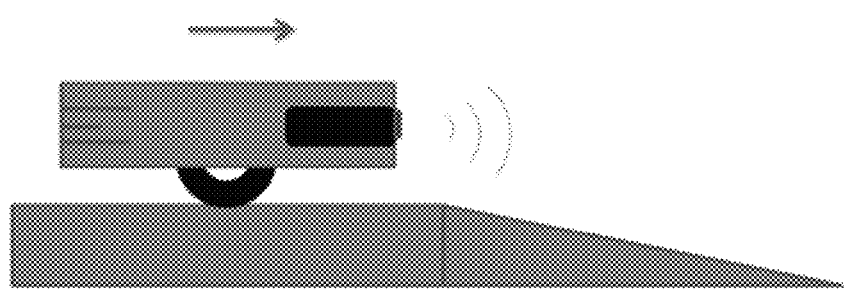
FIG. 8 is a schematic illustration of a downward slope on a front of a floor sweeping robot according to an exemplary embodiment of the present disclosure.

The method for determining the area to be stepped down: if there is a sunken space lower than the working plane in the obstacle area, the obstacle area may be determined to be an area to be stepped down. That is, there is a sunken space in the obstacle area that may require the self-mobile device to step down to access another working plane, for example: a lower step (FIG. 7 is a schematic illustration of a lower step on a front of a floor sweeping robot according to an exemplary embodiment of the present disclosure, and the direction indicated by an arrow is the travel direction of the floor sweeping robot), a downward slope (FIG. 8 is a schematic illustration of a downward slope on a front of a floor sweeping robot according to an exemplary embodiment of the present disclosure, and the direction indicated by an arrow is the travel direction of the floor sweeping robot), and the like.

Figure 5:
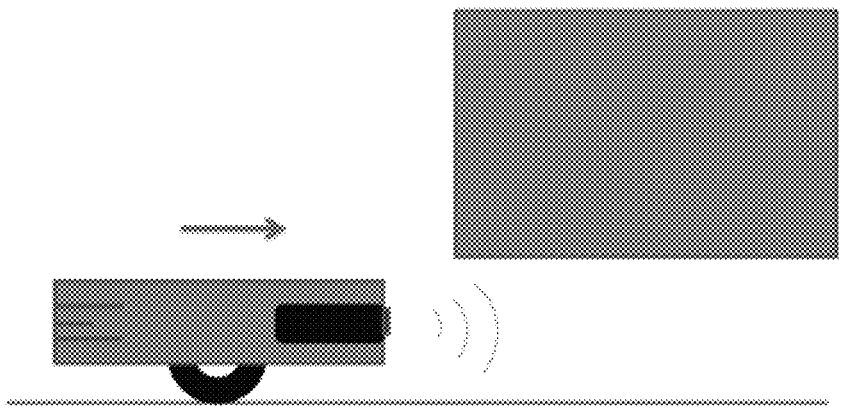
FIG. 5 is a schematic illustration of a gap that constrains a height of a floor sweeping robot according to an exemplary embodiment of the present disclosure.
Figure 6:
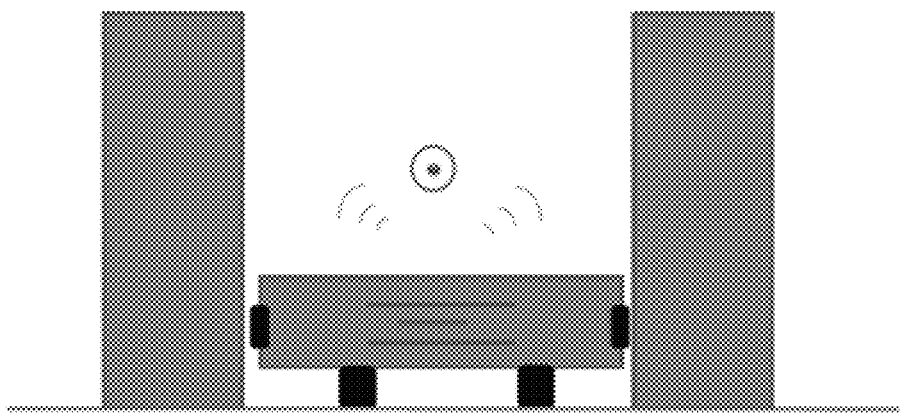
FIG. 6 is a schematic illustration of a gap that constrains a width of a floor sweeping robot according to an exemplary embodiment of the present disclosure.

The method for determining the area to be traversed: if there is a gap with the same height as the working plane in the obstacle area, the obstacle area may be determined to be an area to be traversed. That is, there is a gap on the working plane of the obstacle area that may require the self-mobile device to traverse, wherein the gap includes a gap that constrains the height of the self-mobile device and a gap that constrains the width or length of the self-mobile device (FIG. 5 is a gap that may constrain the height of a floor sweeping robot in an exemplary embodiment of the present disclosure). A gap that constrains the height of the self-mobile device may include: the bottom of a bed, a cabinet, a table, a chair, a tea table, a sofa and the like, and a gap that constrains the width or the length of the self-mobile device may include a narrow corridor gap (FIG. 6 depicts a gap that may constrain the width of a floor sweeping robot in an exemplary embodiment of the present disclosure), for example: gaps formed between various types of furniture (between a sofa and a tea table, between a bed and a cabinet, between a table and a chair, and the like), and gaps formed by the construction of the furniture itself (between chair legs, table legs, and the like).

In the actual working process of the self-mobile device, there may be an obstacle area of an area to be climbed over, an area to be stepped down, and an area to be traversed, or a combination of any two obstacle areas or three obstacle areas. For example, in the household sweeping process of a floor sweeping robot, when the floor sweeping robot enters a bathroom from a living room, a doorway of the bathroom may be provided with a doorsill with a protrusion, and the floor of the bathroom may be lower than that of the living room, at which there are two obstacle areas, namely an area to be climbed over and an area to be stepped down. Combinations of other obstacle areas are also possible and envisioned.

After identifying the obstacle area and the type thereof existing on the travel path, the self-mobile device is subjected to travel control for the obstacle area according to the type of the obstacle area in combination with the relative size relationship between the self-mobile device and the obstacle area. The following describes the manner in which the corresponding travel control is performed on the self-mobile device for different types of obstacle areas.

When the type of the obstacle area is an area to be climbed over, the height of the obstacle in the area to be climbed over is calculated; and according to the relationship between the height of the obstacle and a first threshold value, travel control is carried out on the self-mobile device for the area to be climbed over. Alternatively, if the height of the obstacle is greater than or equal to the first threshold value, the self-mobile device is controlled to execute obstacle avoidance operation; and if the height of the obstacle is smaller than the first threshold value, the self-mobile device is controlled to climb over the area to be climbed over. It should be noted that, in some embodiments, with the first threshold value less than or equal to the height of the body of the self-mobile device from the working plane, obstacle avoidance operation performed for the self-mobile device can be to bypass the obstacle.

It should be noted that when the obstacle on a front is an upward slope, the relationship between the height of the slope and the first threshold value can be used to perform travel control on the self-mobile device for the area to be climbed over. The relationship between the inclination angle of the slope and a third threshold value can also be used for performing travel control on the self-mobile device for the area to be climbed over. The self-mobile device can also be subjected to travel control for the area to be climbed over by combining the relationship between the height of the slope and the first threshold value with the relationship between the inclination angle of the slope and the third threshold value. Various other specific embodiments thereof are possible with reference to some simple variations of the foregoing specific embodiments.

When the self-mobile device needs to climb over the area to be climbed over, in order to improve the success rate of the self-mobile device to climb over the obstacle, the self-mobile device may be controlled to speed up to climb over the area to be climbed over. A first speed required by the self-mobile device to climb over an area to be climbed over may be calculated according to a preset travel speed of the self-mobile device and the height of an obstacle; the self-mobile device may be controlled to climb over the area to be climbed over at the first speed along the travel path. Alternatively, the first speed may be the product of the height of the obstacle, a preset travel speed of the self-mobile device, and a preset first speed coefficient. That is, the first speed may be determined as $V1=h*a1*v$, wherein h is the height of the obstacle; a1 is a speed coefficient which may be measured experimentally; v is the travel speed at which the self-mobile device normally operates. According to some embodiments of the present disclosure, the travel speed of the self-mobile device may be adaptively adjusted according to the height of the obstacle, and the self-mobile device may accelerate to climb over the obstacle, such that the fluency of climbing over is increased. It will be apparent that the speed at which the self-mobile device climbs over an obstacle can be calculated in other ways and that the self-mobile device can climb over the obstacle at its original speed.

When the type of the obstacle area is an area to be stepped down, the depth of a sunken space in the area to be stepped down is calculated; and according to the relationship between the depth of the sunken space and a second threshold value, travel control may be carried out on the self-mobile device for the area to be stepped down. Alternatively, if the depth of the sunken space is greater than or equal to the second threshold value, an obstacle avoidance operation may be executed; and if the depth of the sunken space is less than the second threshold value, the self-mobile device may be controlled to step down to the area to be stepped down to continue working. In some embodiments, the second threshold may be less than or equal to the height of the body of the self-mobile device from a working plane. In particular, it may be possible to perform travel control on the self-mobile device for the area to be stepped down according to the relationship between the three-dimensional information of the sunken space and the three-dimensional information of the self-mobile device. Alternatively, the size relationship between the cross sectional area of the sunken space and the cross sectional area of the self-mobile device may be calculated, then the size relationship between the depth of the sunken space and the second threshold value may be calculated, and whether or not the self-mobile device performs obstacle avoidance operation may be determined. For example, when there is a small pit that is much smaller than the self-mobile device on a front of the self-mobile device, the self-mobile device may be controlled to continue to travel according to a preset travel path; when there is a sunken space that is much larger than the self-mobile device on a front of the self-mobile device, the size relationship between the depth of the sunken space and the second threshold value may be calculated to direct the self-mobile device to perform obstacle avoidance operation or steps down to the sunken space to continue working. When obstacle avoidance operations are performed by the self-mobile device, the self-mobile device may bypass the sunken space and continue travelling.

It should be noted that when the sunken space on a front is a downward slope, the relationship between the height of the slope and the second threshold value may be used to perform travel control on the self-mobile device for the area to be stepped down. The relationship between the inclination angle of the slope and a fourth threshold value may also be used for carrying out travel control on the self-mobile device for the area to be stepped down. The self-mobile device can also be subjected to travel control on the area to be stepped down by combining the relationship between the height of the slope and the second threshold value with the relationship between the inclination angle of the slope and the fourth threshold value. Various other specific embodiments thereof are possible with reference to some simple variations of the foregoing specific embodiments.

When the self-mobile device needs to step down to the area to be stepped down, in order to improve the stability of the self-mobile device stepping down to the area to be stepped down, the self-mobile device may be controlled to reduce the speed to step down to the area to be stepped down. A second speed of the self-mobile device to step down to the area to be stepped down may be calculated according to a preset travel speed of the self-mobile device and the depth of the sunken space; the self-mobile device may step down to the area to be stepped down at the second speed along the travel path. Alternatively, the second speed may be the product of the reciprocal of the depth of the sunken space, a preset travel speed of the self-mobile device, and a preset second speed coefficient. That is, the second speed may be determined as $V2=(1/d)*a2*v$, wherein d is the depth of the sunken space, a2 is a speed coefficient which may be measured experimentally, and v is the travel speed at which the self-mobile device normally operates. According to some embodiments of the present disclosure, the travel speed of the self-mobile device may be adaptively adjusted according to the depth of the sunken space, and the self-mobile device may slow down and step down to the sunken space to continue working, such that the action fluency of the self-mobile device may be increased. The speed at which the self-mobile device steps down into the sunken space may also be calculated in other ways, and the self-mobile device may also step down into the sunken space according to the original speed.

When the type of the obstacle area is an area to be traversed, the height and the width of a gap in the area to be traversed may be calculated; and according to the relationship between the height and the width of the gap and the height of the body of the self-mobile device, travel control may be performed on the self-mobile device for the area to be traversed. Alternatively, if the width of the gap is greater than the width of the body of the self-mobile device, and the height of the gap is greater than the height of the body of the self-mobile device, the self-mobile device may be controlled to continue to travel through the area to be traversed according to the travel path; if at least one of the conditions that the width of the gap is less than or equal to the width of the body of the self-mobile device, and the height of the gap is less than or equal to the height of the body of the self-mobile device is satisfied, an obstacle avoidance operation may be performed. That is, if the space of the gap is sufficient to allow the self-mobile device to pass through, the self-mobile device may pass through the gap, and otherwise, the self-mobile device may be controlled to perform an obstacle avoidance operation.

When the self-mobile device needs to traverse the area to be traversed, in order to improve the success rate of the self-mobile device to traverse the gap, the self-mobile device may be controlled to speed up to traverse the area to be traversed. A third speed at which the self-mobile device continues to travel through the area to be traversed according to the travel path may be calculated according to a preset travel speed of the self-mobile device and the width of the gap; the self-mobile device may continue to travel through the area to be traversed at the third speed along the travel path. Alternatively, the third speed may be a product of the width of the gap, a preset travel speed of the self-mobile device, and a preset third speed coefficient. That is, the third speed may be calculated as $V3=b*a3*v$, wherein b is the width or height of the gap and a3 is a speed coefficient which may be measured experimentally; v is the travel speed at which the self-mobile device normally operates. According to some embodiments of the present disclosure, the travel speed of the self-mobile device may be adaptively adjusted according to the height and width information of the gap, and the self-mobile device may accelerate to pass through the gap, such that the action fluency of the self-mobile device may be increased. The speed at which the self-mobile device traverses the gap may also be calculated in other ways, and the self-mobile device may also traverse the gap at the original rate.

The method of the travel control of the present disclosure is described below in connection with embodiments of different scenarios.

Application Scenario 1: in a driving scene of an unmanned vehicle, the unmanned vehicle utilizes an area array solid-state laser radar installed on the body of the unmanned vehicle to collect road surface information on a travel path in real time. When there are trees falling on the road surface on the travel path of the unmanned vehicle, the unmanned vehicle may obtain three-dimensional information of the trees on the road surface ahead through the area array solid-state laser radar, may obtain an abnormal state on the road surface through analysis, may determine that the area on the road surface ahead is an obstacle area and an obstacle protruding out of the road surface exists in the obstacle area, may determine the obstacle area to be an area to be climbed over, and may calculate the height of the trees falling on the road surface. If the height of the fallen trees on the road surface is greater than or equal to the threshold value, which may be the height of the vehicle body of the unmanned vehicle, the unmanned vehicle may be controlled to retreat and re-plan a travel path. The unmanned vehicle may be controlled to climb over the trees if the height of the fallen trees on the road surface is less than the threshold value, which may be the height of the vehicle body of the unmanned vehicle. When the unmanned vehicle is controlled to climb over the trees, in order to improve the smooth climbing over the trees by the unmanned vehicle, the unmanned vehicle may be controlled to speed up to climb over the trees on the road surface ahead, and the speed at which the unmanned vehicle climbs over the trees may be the product of the height of the fallen trees, a preset travel speed of the unmanned vehicle and a preset speed coefficient.

Application Scenario 2: in a floor cleaning scene of a floor sweeping robot, the floor sweeping robot may collect floor information on a travel path in real time by using an area array solid-state laser radar installed on a front of the mechanical body of the floor sweeping robot to obtain three-dimensional information on the floor. When there is a chair on the travel path on a front of the floor sweeping robot, the floor sweeping robot may obtain the three-dimensional information of the chair on the road surface ahead through the area array solid-state laser radar, may obtain an abnormal state on the floor ahead through analysis, may determine an area on the floor ahead as an obstacle area with a gap formed below the chair, may determine the obstacle area to be an area to be traversed, and may calculate the height and the width of the gap below the chair. The floor sweeping robot may be controlled to continue to travel into the area below the chair according to the travel path to continue sweeping work if the width of the gap below the chair is greater than the width of the floor sweeping robot and the height of the gap below the chair is greater than the height of the floor sweeping robot. The floor sweeping robot may be controlled to continue to sweep around the chair when at least one of the conditions that the width of the gap below the chair is less than or equal to the width of the floor sweeping robot and the height of the gap is less than or equal to the total height of the floor sweeping robot is satisfied. When the height of the gap below the chair is far greater than the total height of the floor sweeping robot, and the width below the chair is greater than the width of the floor sweeping robot, the floor sweeping robot is directed to traverse the gap below the chair, in order to improve the success rate of the floor sweeping robot in traversing the gap, the floor sweeping robot may be controlled to speed up to traverse the gap below the chair. And the speed of the floor sweeping robot passing through the gap below the chair may be the product of the width of the gap, a preset travel speed of the floor sweeping robot and a preset speed coefficient.

Application Scenario 3: in a shopping guide scene of a shopping guide robot in a shopping mall, the shopping guide robot may collect ground information on a travel path in real time by using an area array solid-state laser radar installed on the mechanical body of the shopping guide robot to obtain three-dimensional information on the ground. When there is a lower step on the travel path on a front of the shopping guide robot, the shopping guide robot may acquire the three-dimensional information of the lower step on the road surface ahead through the area array solid-state laser radar, may obtain an abnormal state on the ground ahead through analysis, may determine that the area ahead the ground is an obstacle area, may determine that a sunken space lower than the ground exists in the obstacle area, may determines the obstacle area to be an area to be stepped down, and may calculate the depth of the sunken space. The shopping guide robot may be controlled to bypass if the depth of the sunken space is greater than or equal to a threshold, which may be the height of the mechanical body of the shopping guide robot. The shopping guide robot may be controlled to step down to the ground below the step to continue working if the depth of the sunken space is less than the threshold, which may be the height of the mechanical body of the shopping guide robot. When the shopping guide robot is directed to step down to the area to be stepped down, in order to improve the stability of the shopping guide robot stepping down to the sunken space below the step, the shopping guide robot may be controlled to reduce the speed to step down to the sunken space below the step. The speed of the shopping guide robot stepping down to the sunken space below the step may be the product of the reciprocal of the depth of the sunken space, a preset travel speed of the shopping guide robot and a preset speed coefficient.

Figure 9:
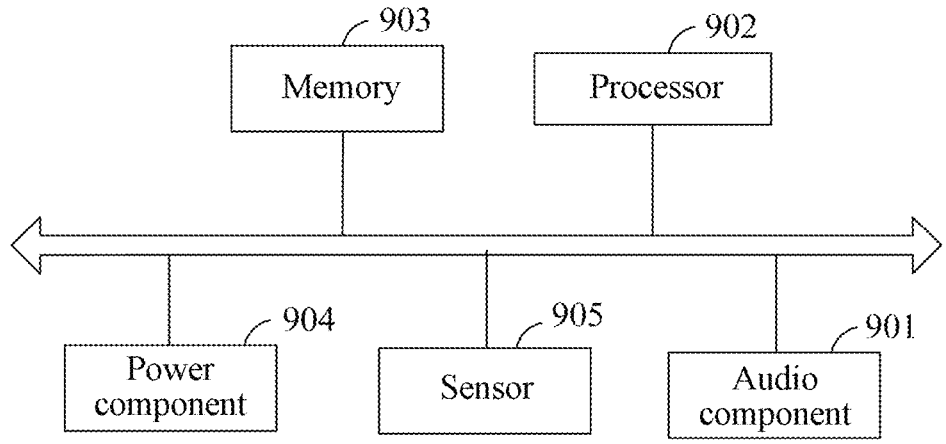
FIG. 9 is a block diagram of a self-mobile device according to an exemplary embodiment of the present disclosure.

FIG. 9 is a block diagram of a self-mobile device according to an exemplary embodiment of the present disclosure. The self-mobile device may include one or more processors 902 and one or more memories 903 storing computer programs and a sensor 905. The sensor 905 may be an area array solid-state laser radar and may be configured to collect three-dimensional environment information on a travel path of a self-mobile device. In some embodiments, additional components such as an audio component 901, a power component 904, etc. may also be included. The one or more processors 902 may be configured to execute the computer programs for:

collecting three-dimensional environment information on a travel path of the self-mobile device;

identifying an obstacle area and a type thereof existing on the travel path of the self-mobile device based on the three-dimensional environment information; and performing travel control on the self-mobile device for the obstacle area according to the type of the obstacle area.

Alternatively, the one or more processors 902, based on the three-dimensional environment information, may identify obstacle areas and types thereof existing on a travel path of the self-mobile device by: identifying an abnormal area on the travel path of the self-mobile device as an obstacle area based on the three-dimensional environment information; and determining the type of the obstacle area according to the abnormal state of the obstacle area relative to a working plane.

Alternatively, the one or more processors 902 may determine the type of obstacle area based on the abnormal state of the obstacle area relative to the working plane by: determining the obstacle area to be an area to be climbed over if an obstacle protruding out of the working plane exists in the obstacle area; determining the obstacle area to be an area to be stepped down if a sunken space lower than the working plane exists in the obstacle area; and determining the obstacle area to be an area to be traversed if a gap with the same height as the working plane exists in the obstacle area.

Alternatively, the one or more processors 902 may perform travel control on the self-mobile device according to the type of the obstacle area by: performing travel control on the self-mobile device for the obstacle area according to the type of the obstacle area in combination with the relative size relationship between the self-mobile device and the obstacle area.

Alternatively, the one or more processors 902 may perform travel control on the self-mobile device based on the type of the obstacle area and the relative size relationship between the self-mobile device and the obstacle area by: calculating the height of the obstacle in the area to be climbed over if the type of the obstacle area is an area to be climbed over; and carrying out travel control on the self-mobile device for the area to be climbed over based on the relationship between the height of the obstacle and a first threshold value, wherein the first threshold value is less than or equal to the height of the body of the self-mobile device from the working plane.

Alternatively, the one or more processors 902 may perform travel control on the self-mobile device for the area to be climbed over according to the relationship between the height of the obstacle and the height of the body of the self-mobile device by: controlling the self-mobile device to execute an obstacle avoidance operation if the height of the obstacle is greater than or equal to the first threshold value; and controlling the self-mobile device to climb over the area to be climbed over if the height of the obstacle is less than the first threshold value.

Alternatively, the one or more processors 902 may perform travel control on the self-mobile device for the obstacle area based on, the type of the obstacle area in combination with the relative size relationship of the self-mobile device and the obstacle area by: calculating the depth of the sunken space in the area to be stepped down if the type of the obstacle area is an area to be stepped down; and carrying out travel control on the self-mobile device aiming at the area to be jumped down based on the relationship between the depth of the sunken space and a second threshold value, wherein the second threshold value is smaller than or equal to the height of the body of the self-mobile device from the working plane.

Alternatively, the one or more processors 902 may perform travel control on the self-mobile device for the area to be stepped down according to the relationship between the depth of the sunken space and the second threshold value by: executing an obstacle avoidance operation if the depth of the sunken space is greater than or equal to the second threshold value; and controlling the self-mobile device to step down to the area to be stepped down to continue working if the depth of the sunken space is less than the second threshold value.

Alternatively, the one or more processors 902 may perform travel control on the self-mobile device for the obstacle area based on the type of the obstacle area in combination with the relative size relationship of the self-mobile device and the obstacle area by: calculating the height and the width of a gap in the area to be traversed if the type of the obstacle area is an area to be traversed; and carrying out travel control on the self-mobile device aiming at the area to be traversed according to the relationship between the height and the width of the gap and the height of the body of the self-mobile device.

Alternatively, the one or more processors 902 may perform travel control on the self-mobile device for the area to be traversed according to the relationship between the height and width of the gap and the height of the body of the self-mobile device by: controlling the self-mobile device to continuously travel through the area to be traversed according to the travel path if the width of the gap is greater than the width of the body of the self-mobile device and the height of the gap is greater than the height of the body of the self-mobile device; performing an obstacle avoidance operation if at least one of the conditions that the width of the gap is less than or equal to the width of the body of the self-mobile device, and the height of the gap is less than or equal to the height of the body of the self-mobile device is satisfied.

According to some embodiments of the present disclosure, the self-mobile device may collect three-dimensional environment information on a travel path of itself in the travel process, identify obstacle areas and types thereof existing on the travel path of the self-mobile device based on the three-dimensional environment information, and adopt different travel controls in a targeted manner for different types of the areas, such that the obstacle avoidance performance of the self-mobile device may be improved by adopting the method of the travel control in the present disclosure.

Accordingly, the embodiments of the present disclosure further provide a computer-readable storage medium having computer programs stored thereon. The computer-readable storage medium stores computer programs which, when executed by the one or more processors 902, cause the one or more processors 902 to accordingly perform the steps in the embodiment of the method shown in FIG. 1.

Figure 10:
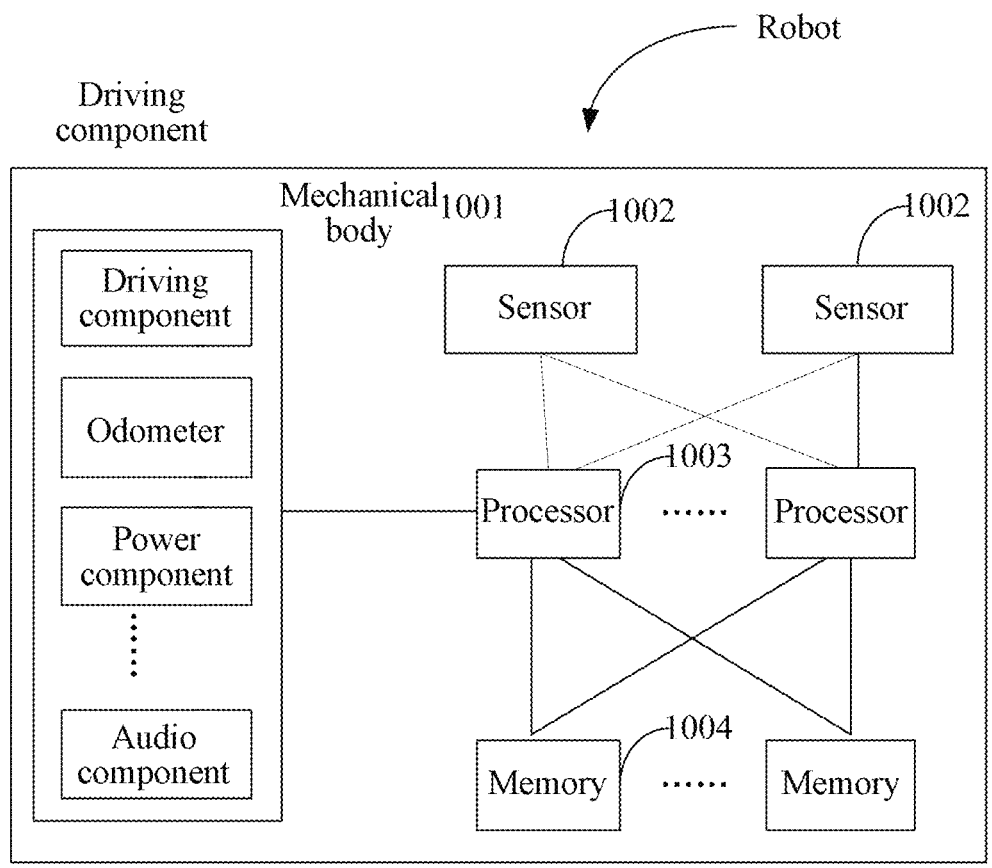
FIG. 10 is a block diagram of a robot according to an exemplary embodiment of the present disclosure.

The self-mobile device may be a robot, an unmanned vehicle and the like. FIG. 10 is a block diagram of a robot according to an exemplary embodiment of the present disclosure. As shown in FIG. 10, the robot may include: a mechanical body 1001. The mechanical body 1001 may include one or more processors 1003 and one or more memories 1004 for storing computer instructions. In addition, the mechanical body 1001 may further include a sensor 1002. The sensor 1002 may be an area array solid-state laser radar and may be configured to collect three-dimensional environment information on a travel path of the self-mobile device in the robot working process.

In some embodiments, the mechanical body 1001 may include, in addition to the one or more processors 1003 and the one or more memories 1004, some basic components of a robot, such as an audio component, a power component, an odometer, a driving component, etc. The audio component may be configured to output and/or input audio signals. For example, the audio component may include a microphone (MIC) configured to receive external audio signals when the device in which the audio component is located is in an operational mode, such as a call mode, a record mode, and a voice recognition mode. The received audio signals may be further stored in the memories 1004 or transmitted via a communication component. In some embodiments, the audio component may further include a speaker for outputting audio signals. The sensor 1002 may further include a dryness and humidity sensor 1002 or the like. Alternatively, the driving component may include driving wheels, a driving motor, universal wheels, etc. Alternatively, a cleaning component may include a cleaning motor, a cleaning brush, a dusting brush, a dust collection fan, etc. The basic components and the composition of the basic components contained in different robots are different, and only part of the examples are presented in the embodiments of the present disclosure.

It should be noted that in some embodiments, the audio component, the sensor 1002, the one or more processors 1003, and the one or more memories 1004 may be provided within or on a surface of the mechanical body 1001.

In some embodiments, the mechanical body 1001 may be an execution mechanism by which the robot performs a task, which can execute the operations specified by the processors 1003 in a certain environment. In some embodiments, the mechanical body may reflect the appearance of a robot to some extent. In the embodiment, the appearance of the robot is not limited, and may be, for example, a circle, an ellipse, a triangle, a convex polygon, etc.

The one or more memories 1004 may be primarily configured to store computer programs that, when executed by the one or more processors 1003, cause the one or more processors 1003 to perform travel control operations on the self-mobile device. In addition to storing computer programs, the one or more memories 1004 may be configured to store various other data to support operations on the robot.

The one or more processors 1003, which may be considered the control system of the robot, may be configured to execute the computer programs stored in the one or more memories 1004 to perform travel control operations on the self-mobile device.

The processors 1003 may execute computer programs stored, for example, in the one or more memories 1004, for:
collecting three-dimensional environment information on a travel path of the self-mobile device;
identifying an obstacle area and a type thereof existing on the travel path of the self-mobile device based on the three-dimensional environment information;
performing travel control on the self-mobile device for the obstacle area according to the type of the obstacle area.

Alternatively, the one or more processors 1003 may identify obstacle areas and types thereof existing on the travel path of the self-mobile device based on the three-dimensional environment information by: identifying an abnormal area on the travel path of the self-mobile device as an obstacle area based on the three-dimensional environment information; and determining the type of the obstacle area according to the abnormal state of the obstacle area relative to a working plane.

Alternatively, the one or more processors 1003 may determine the type of the obstacle area based on the abnormal state of the obstacle area relative to the working plane by: determining the obstacle area to be an area to be climbed over if there is an obstacle protruding out of the working plane in the obstacle area; determining the obstacle area to be an area to be stepped down if there is a sunken space lower than the working plane in the obstacle area; and determining the obstacle area to be an area to be traversed if there is a gap with the same height as the working plane in the obstacle area.

Alternatively, the one or more processors 1003 may perform travel control on the self-mobile device for the obstacle area according to the type of the obstacle area by: performing travel control on the self-mobile device for the obstacle area based on the type of the obstacle area in combination with the relative size relationship between the self-mobile device and the obstacle area.

Alternatively, the one or more processors 1003 may perform travel control on the self-mobile device for the obstacle area based on the type of the obstacle area in combination with the relative size relationship of the self-mobile device and the obstacle area by: calculating the height of the obstacle in the area to be climbed over if the type of the obstacle area is an area to be climbed over; and performing travel control on the self-mobile device for the area to be climbed according to the relationship between the height of the obstacle and a first threshold value, wherein the first threshold value is less than or equal to the height of the body of the self-mobile device from the working plane.

Alternatively, the one or more processors 1003 may perform travel control on the self-mobile device for the area to be climbed over according to the relationship between the height of the obstacle and the height of the body of the self-mobile device by: controlling the self-mobile device to execute obstacle avoidance operation if the height of the obstacle is greater than or equal to the first threshold value; and controlling the self-mobile device to climb over the area to be climbed over if the height of the obstacle is smaller than the first threshold value.

Alternatively, the one or more processors 1003 may perform travel control on the self-mobile device for the obstacle area according to the type of the obstacle area in combination with the relative size relationship of the self-mobile device and the obstacle area by: calculating the depth of the sunken space in the area to be stepped down if the type of the obstacle area is an area to be stepped down; and performing travel control on the self-mobile device for the area to be stepped down according to the relationship between the depth of the sunken space and a second threshold value, wherein the second threshold value is less than or equal to the height of the body of the self-mobile device from the working plane.

Alternatively, the one or more processors 1003 may perform travel control on the self-mobile device for the area to be stepped down based on the relationship between the depth of the sunken space and the second threshold by: executing obstacle avoidance operation if the depth of the sunken space is greater than or equal to the second threshold value; and controlling the self-mobile device to step down to the area to be stepped down to continue working if the depth of the sunken space is less than the second threshold value.

Alternatively, the one or more processors 1003 may perform travel control on the self-mobile device for the obstacle area according to the type of the obstacle area in combination with the relative size relationship of the self-mobile device and the obstacle area by: calculating the height and the width of a gap in the area to be traversed if the type of the obstacle area is an area to be traversed; and performing travel control on the self-mobile device for the area to be traversed according to the relation between the height and the width of the gap and the height of the body of the self-mobile device.

Alternatively, the one or more processors 1003 may perform travel control on the self-mobile device for the area to be traversed according to the relationship between the height and width of the gap and the height of the body of the self-mobile device by: controlling the self-mobile device to continuously travel through the area to be traversed according to the travel path if the width of the gap is greater than the width of the body of the self-mobile device, and the height of the gap is greater than the height of the body of the self-mobile device; performing an obstacle avoidance operation if at least one of the conditions that the width of the gap is less than or equal to the width of the body of the self-mobile device and the height of the gap is less than or equal to the height of the body of the self-mobile device is satisfied.

In the robot embodiments of the present disclosure, the self-mobile device may collect three-dimensional environment information on a travel path of itself in the travel process, identify the obstacle area and the type thereof existing on the travel path of the self-mobile device based on the three-dimensional environment information, and adopt different travel controls in a targeted manner for different types of the area, such that the obstacle avoidance performance of the self-mobile device may be improved by adopting the method of the travel control in the present disclosure.

Accordingly, the embodiments of the present disclosure further provide a computer-readable storage medium having computer programs stored thereon. The computer-readable storage medium stores computer programs which, when executed by the one or more processors 1003, cause the one or more processors 1003 to accordingly perform the steps in the embodiment of the method shown in FIG. 1.

The present disclosure is described with reference to the flow diagrams and/or block diagrams of the methods, device (systems), and computer program products according to the embodiments of the present disclosure. It is to be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to generate a machine, such that the instructions, when executed via the processor of the computer or other programmable data processing devices, generate means for implementing the functions specified in one flow or more flows in the flow diagrams and/or one block or more blocks in the block diagram.

These computer program instructions may also be stored in a computer-readable memory that can direct a computer or other programmable data processing devices to function in a particular manner, such that the instructions stored in the computer-readable memory generate a manufactured product including instruction means which implement the function specified in one flow or more flows in the flow diagrams and/or one block or more blocks in the block diagrams.

These computer program instructions may further be loaded onto a computer or other programmable data processing devices to cause a series of operational steps to be performed on the computer or other programmable devices to generate a computer implemented process such that the instructions which are executed on the computer or other programmable devices provide steps for implementing the functions specified in one flow or more flows in the flow diagrams and/or one block or more blocks in the block diagrams.

In a typical configuration, a computing device includes one or more processors (CPUs), input/output interfaces, network interfaces, and memories.

The memories may include non-volatile memory, random access memory (RAM), and/or non-volatile memory, etc. in computer-readable media, such as read only memory (ROM) or flash RAM. The memories are an example of the computer-readable medium.

The computer-readable medium, including both non-volatile and volatile media, removable and non-removable media, may implement information storage by any method or technique. The information may be computer-readable instructions, data structures, modules of a program, or other data. Examples of a computer storage medium include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disk (DVD) or other optical storage, magnetic cassettes, magnetic tape-magnetic disk storage or other magnetic storage devices, or any other non-transmission medium, or any other medium that can be configured to store information that can be accessed by the computing device. As defined herein, the computer-readable medium does not include transitory computer-readable media (transitory media), such as modulated data signals and carrier waves.

It should also be noted that the terms "comprise", "include", or any other variation thereof, are intended to cover a non-exclusive inclusion, such that a process, method, article, or device that comprises a list of elements does not include only those elements but may include other elements not expressly listed or inherent to such process, method, article, or device. An element defined by the phrase "comprises a" does not, without more constraints, preclude the existence of additional identical elements in the process, method, article, or device that comprises such element.

The foregoing is by way of example only and is not intended to limit the present disclosure. Those skilled in the art may make various modifications and variations to the present disclosure. Any modifications, equivalents, improvements, etc. that come within the spirit and principles of the present disclosure shall fall within the scope of the claims appended hereto.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of travel control, applicable to a self-mobile device, wherein the method comprises:
    collecting three-dimensional environment information on a travel path of the self-mobile device;
    identifying an obstacle area and a type thereof existing on the travel path of the self-mobile device based on the three-dimensional environment information; and
    performing travel control on the self-mobile device for the obstacle area according to the type of the obstacle area;
    wherein the performing travel control on the self-mobile device for the obstacle area according to the type of the obstacle area comprises:
    performing the travel control on the self-mobile device for the obstacle area according to the type of the obstacle area in combination with a relative size relationship between the self-mobile device and the obstacle area;
    wherein the performing the travel control on the self-mobile device for the obstacle area according to the type of the obstacle area in combination with the relative size relationship between the self-mobile device and the obstacle area comprises:
    if the type of the obstacle area is an area to be traversed, calculating a height and a width of a gap in the area to be traversed; and
    performing the travel control on the self-mobile device for the area to be traversed according to a relationship between the height and the width of the gap and a height of a body of the self-mobile device.

2. The method according to claim 1, wherein the identifying the obstacle area and the type thereof existing on the travel path of the self-mobile device based on the three-dimensional environment information comprises:
    identifying an abnormal area on the travel path of the self-mobile device as the obstacle area based on the three-dimensional environment information; and
    determining a type of the obstacle area according to an abnormal state of the obstacle area relative to a working plane.

3. The method according to claim 2, wherein the determining the type of the obstacle area according to the abnormal state of the obstacle area relative to the working plane comprises:
    if an obstacle protruding out of the working plane exists in the obstacle area, determining the obstacle area to be an area to be climbed over;
    if a sunken space lower than the working plane exists in the obstacle area, determining the obstacle area to be an area to be stepped down; and
    if a gap with a same height as the working plane exists in the obstacle area, determining the obstacle area to be an area to be traversed.

4. The method according to claim 1, wherein the performing the travel control on the self-mobile device for the obstacle area according to the type of the obstacle area in combination with the relative size relationship between the self-mobile device and the obstacle area comprises:
    if the type of the obstacle area is an area to be climbed over, calculating a height of an obstacle in the area to be climbed over; and
    performing the travel control on the self-mobile device for the area to be climbed over according to a relationship between the height of the obstacle and a first threshold value, wherein the first threshold value is smaller than or equal to a height of a body of the self-mobile device from a working plane.

5. The method according to claim 4, wherein the performing the travel control on the self-mobile device for the area to be climbed over according to the relationship between the height of the obstacle and the first threshold value comprises:
    if the height of the obstacle is greater than or equal to the first threshold value, controlling the self-mobile device to execute an obstacle avoidance operation; and
    if the height of the obstacle is smaller than the first threshold value, controlling the self-mobile device to climb over the area to be climbed over.

6. The method according to claim 1, wherein the performing the travel control on the self-mobile device for the obstacle area according to the type of the obstacle area in combination with the relative size relationship between the self-mobile device and the obstacle area comprises:

if the type of the obstacle area is an area to be stepped down, calculating a depth of a sunken space in the area to be stepped down; and performing the travel control on the self-mobile device for the area to be stepped down according to a relationship between the depth of the sunken space and a second threshold value, wherein the second threshold value is smaller than or equal to a height of a body of the self-mobile device from a working plane.

7. The method according to claim 6, wherein the performing the travel control on the self-mobile device for the area to be stepped down according to the relationship between the depth of the sunken space and the second threshold value comprises:

if the depth of the sunken space is greater than or equal to the second threshold value, executing an obstacle avoidance operation; and if the depth of the sunken space is less than the second threshold value, controlling the mobile device to step down to the area to be stepped down to continue working.

8. The method according to claim 1, wherein the performing the travel control on the self-mobile device for the area to be traversed according to the relationship between the height and the width of the gap and the height of the body of the self-mobile device comprises:

if the width of the gap is greater than the width of the body of the self-mobile device and the height of the gap is greater than the height of the body of the self-mobile device, controlling the self-mobile device to continuously travel through the area to be traversed in accordance with the travel path; and if at least one of the width of the gap being less than or equal to the width of the body of the self-mobile device and the height of the gap being less than or equal to the height of the body of the self-mobile device is satisfied, executing an obstacle avoidance operation.

9. A self-mobile device, comprising:

a mechanical body, wherein the mechanical body is provided with an area array solid-state laser radar, one or more processors and one or more memories for storing computer programs;

wherein the area array solid-state laser radar is configured to collect three-dimensional environment information on a travel path of the self-mobile device;

wherein the one or more processors are configured to execute the computer programs for:

identifying an obstacle area and a type thereof existing on the travel path of the self-mobile device based on the three-dimensional environment information; and performing travel control on the self-mobile device for the obstacle area according to the type of the obstacle area;

wherein the performing travel control on the self-mobile device for the obstacle area according to the type of the obstacle area comprises:

performing the travel control on the self-mobile device for the obstacle area according to the type of the obstacle area in combination with a relative size relationship between the self-mobile device and the obstacle area;

wherein the performing the travel control on the self-mobile device for the obstacle area according to the type of the obstacle area in combination with the relative size relationship between the self-mobile device and the obstacle area comprises:

if the type of the obstacle area is an area to be traversed, calculating a height and a width of a gap in the area to be traversed; and performing the travel control on the self-mobile device for the area to be traversed according to a relationship between the height and the width of the gap and a height of a body of the self-mobile device.

10. The self-mobile device according to claim 9, wherein the self-mobile device is a floor sweeping robot and the area array solid state laser radar is disposed on a front of the mechanical body.

11. A Non-transitory computer-readable storage medium having computer programs stored thereon that, when executed by one or more processors, cause the one or more processors to perform actions comprising:

collecting three-dimensional environment information on a travel path of a self-mobile device;

identifying an obstacle area and a type thereof existing on the travel path of the self-mobile device based on the three-dimensional environment information; and performing travel control on the self-mobile device for the obstacle area according to the type of the obstacle area;

wherein the performing travel control on the self-mobile device for the obstacle area according to the type of the obstacle area comprises:

performing the travel control on the self-mobile device for the obstacle area according to the type of the obstacle area in combination with a relative size relationship between the self-mobile device and the obstacle area;

wherein the performing the travel control on the self-mobile device for the obstacle area according to the type of the obstacle area in combination with the relative size relationship between the self-mobile device and the obstacle area comprises:

if the type of the obstacle area is an area to be traversed, calculating a height and a width of a gap in the area to be traversed; and performing the travel control on the self-mobile device for the area to be traversed according to a relationship between the height and the width of the gap and a height of a body of the self-mobile device.

* * * * *